United States Patent Office 2,954,871
Patented Oct. 4, 1960

2,954,871

CYCLONIC SEPARATION OF DRILLING FLUIDS

James L. Lummus and Piatho P. Scott, Jr., Tulsa, Okla., assignors to Pan American Petroleum Corporation, a corporation of Delaware Filed July 30, 1956, Ser. No. 600,985

8 Claims. (Cl. 209—211)

Our invention relates to treating drilling fluids. More particularly, it relates to apparatus and methods for separating various drilling fluid constituents from one another.

When drilling wells in many areas, particularly along the Gulf of Mexico, many of the formations drilled are clay or shale. As these formations are drilled the clay and shale become finely dispersed in the drilling fluid. As a result, the viscosity and gel strength of the drilling fluid rapidly rise to objectionable values. Dilution with water is the simplest solution to this difficulty except where the mud is heavily weighted to prevent entry of high pressure gas into the well. Dilution of such drilling fluids with water decreases the mud density. Large quantities of weighting agents such as barite and the like are then required to bring the density back into the desired range. Some dilution can be avoided by chemical treatment but eventually the drilling fluid must be diluted or thrown away.

The problem is further complicated when lost circulation occurs. That is, when drilling fluid is lost to crevices, fractures, vugs, and the like in formations penetrated by the well. When such lost circulation occurs, lost circulation recovery materials such as ground walnut shells, mica flakes, hemp, or other granular, lamellated or fibrous materials are usually added to the drilling fluid to bridge across the opening through which drilling fluid is being lost to the formations. In order that effective bridging may occur, the particles of such additives are generally much too large to pass through a shale shaker. In order that the lost circulation recovery materials can remain in the drilling fluid and continue to function, the shale shaker is frequently bypassed. Thus, a problem is created in which it is desirable to remove from drilling fluid clay and shale particles ranging from 1-inch or more in largest dimension down to colloidal clay particles having dimensions of the order of $1/100,000$ inch or even smaller. These particles should be removed without substantially affecting the content of lost circulation recovery materials and of weighting materials.

Frequently, anhydrite or salt beds are drilled resulting in dispersion of anhydrite or salt in the mud. In some cases, salt water flows into the well from the formation to introduce salt into the mud. These contaminants may seriously affect mud properties requiring dilution and re-weighting of the drilling fluid. In severe cases, the mud may be discarded entirely, requiring the time, trouble, and expense of preparing a completely new batch of mud. Chemical treatment may also be employed to control mud properties in such cases but again this solution is usually very expensive and is not always certain to give the desired control.

Heavy chemical treatment often produces an over-treated drilling fluid containing so-called "dead" clay solids. That is, clay solids which will no longer respond to chemical treatment. Removal of such dead clay solids and replacement with fresh clay solids without substantially affecting the drilling fluid content of lost circulation recovery materials and weighting agents is also a problem requiring solution.

For many years drillers in those areas, where long sections of clay and shale are drilled, have spent hundreds of dollars per day on chemical treatments and additional large sums on weighting agents for drilling fluids for each well. Large amounts of lost circulation recovery materials have been discarded on shale shakers with large bit cuttings to avoid the excess build-up of clay solids which quickly occurs when the shale shaker is bypassed to keep the lost circulation recovery material in the drilling fluid. Many mechanical and chemical solutions to these problems have been offered over a long period of years but few have proved acceptable to solve even one of the problems. No method for simultaneously solving all these long-standing problems has been proposed.

With the above problems in mind, the principal object of this invention is to provide a method for removing a substantial amount of the clay solids from a drilling fluid without substantially affecting the concentration of weighting agents. A specific object is to provide a simple mechanical means for separating clay solids and weighting agents in drilling fluids. Another object is to provide means for rejecting clay and shale solids from drilling fluids without substantially affecting the concentrations of weighting agents such as barite or lost circulation recovery materials such as ground walnut shells. An additional object of the invention is to reject impurities such as salt, anhydrite, and the like, as well as shale and clay solids, including overtreated solids, from the drilling fluid while retaining substantially all of the weighting agents and lost circulation recovery materials in the drilling fluid.

In general, we accomplish the separation of drilling fluid contaminants and clay solids from weighting agents by passing at least a portion of the drilling fluid through equipment commonly called a wet cyclone. It is true that most wet cyclones will not accomplish the desired separation. It is also true that even if the correct cyclone is employed it may not produce the desired separation unless operated within limited ranges of conditions. For complete control of the clay and shale solids in the presence of lost circulation recovery material, two cyclones preferably of different sizes operated under different conditions should be employed. The particular design of the cyclones and the operating conditions required to accomplish our objects will now be considered in more detail.

In the drawings, Figure 1 illustrates a preferred cyclone capable of use for our purposes.

Figure 1:
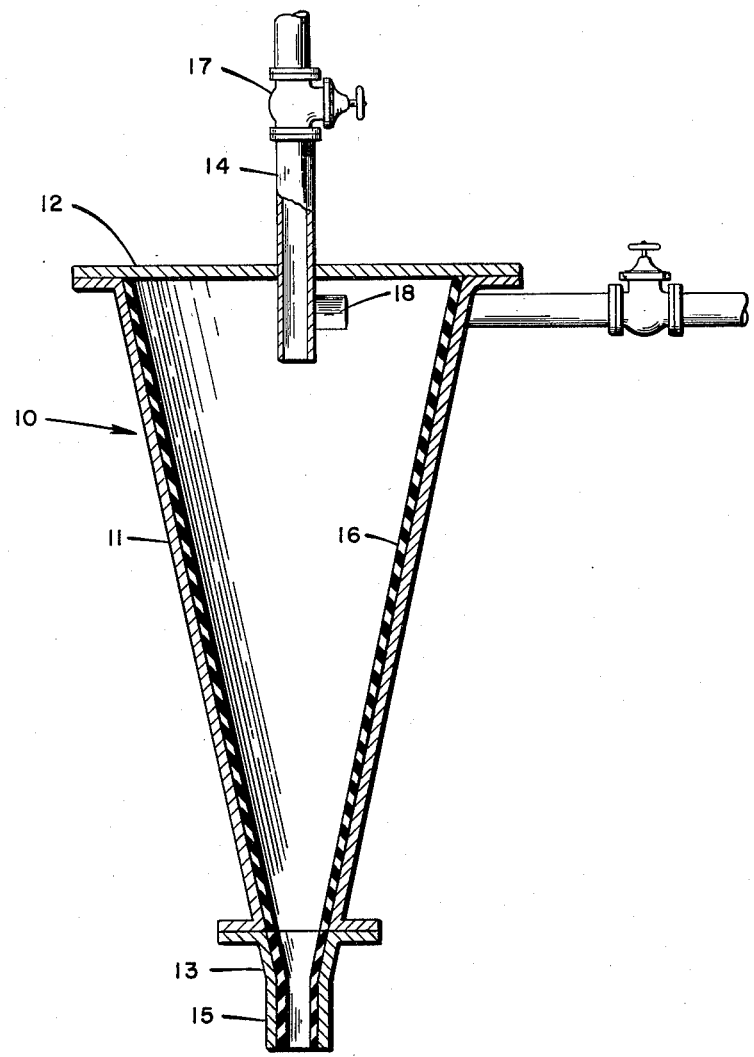

As shown in Figure 1, the cyclone 10 should be made up of a conical portion 11, a closure member 12 for the large end of the cone, and an end member 13 for the apex end of the cone. The closure member 12 should contain an outlet conduit 14 extending through the cover plate 12. This conduit should extend at least an inch or two into the cyclone itself and should be substantially at the axis of the cone. It is comonly called a vortex finder. The apex end portion 13 should include a short straight section 15 at least about an inch long. This apex portion 13 is preferably detachable from the conical part of the cyclone to facilitate changing the size of the outlet opening by changing the apex portion. This detachability also simplifies replacement of this portion of the cyclone which is most subject to wear. Small cyclones are usually lined with a resilient lining 16 such as rubber, to decrease the rate of wear. The liner should be separate from the supporting wall of the cyclone to make possible its easy replacement when worn. Larger cyclones generally are not rubber lined but may be so lined if desired. The supporting wall of the cyclone may be of various metals or alloys, such as aluminum, steel, or the like. The inlet 18 may be rectangular, as shown, or round. It must enter substantially at a tangent to the circumference of the cone or of a short cylindrical section sometimes provided at the top of the cone. This cylindrical section, if used, should be about the same diameter as the largest diameter of the cone. If the axis of the cyclone is vertical, the inlet conduit is preferably horizontal, but it may be at an angle of as much as about 30° with the horizontal in either direction.

Further discussions will be simplified by use of certain terms, the meaning of which should first be defined. The cyclone is usually operated with the large end on top and the apex end on the bottom. For this reason, the effluents from the large end and the apex end of the cyclone are generally referred to as the overflow and underflow, respectively. The terms "overflow" and "underflow" will be used throughout the discussion for simplicity. It will be understood, however, that the cyclone will still function satisfactorily if turned on its side or inverted. Thus, the term "underflow" should be considered to mean the effluent from the apex end of the cyclone, and the term "overflow" should be considered to mean the effluent from the large end of the cyclone, regardless of the position of the cyclone. The most common weighting agent for drilling muds is barite. Therefore, this term will generally be used hereinafter. It should be understood, however, that any weighting agent having a specific gravity greater than about 3 compared to water, if ground to a sufficient fineness to remain suspended in most aqueous drilling fluids, can be substituted for the barite. For example, iron oxide, strontium sulfate, or the like, may be substituted for the barite.

The large diameter of the cone is critical. If it is too large, an adequate separation of clay and barite cannot be obtained. If too small, operating conditions become too sensitive to minor changes in flow rates, pressures, and the like, and the cyclone is easily plugged by drilling fluid solids. We have found that the large diameter of the cyclone must be within the range of about 2 to about 8 inches and preferably about 3 inches if proper operation is to be obtained.

The length of the cone is also critical. The ratio of length to large diameter must not be too great or the capacity of the cyclone is severely reduced. The ratio must not be too small or a proper separation cannot be made. We have found that the ratio of length to largest diameter of the cone should be between about 2 and about 8 and preferably about 4. The length used in calculating this ratio should exclude the length of any cylindrical portions at either end of the cone.

The area of the tangential inlet to the cyclone must not be too large, or the cyclone will be flooded, and insufficient liquid velocity within the cyclone will be obtained to achieve the desired separation. The area must not be too small, however, or the capacity of the cyclone will be too greatly reduced. The sizes of the two outlet openings must also be within critical limits. The underflow outlet of the cyclone must be small to restrict the flow from this opening and force the undesirable clay, and mud contaminants, out the large end of the cyclone. The underflow opening must not be too small, however, to avoid forcing too much of the weighting agent out the large end with the clay. The overflow outlet may vary considerably in size since flow from this end is usually controlled principally by valve 17. However, it must be large enough to accommodate the desired rate of flow through this opening. It cannot be too large, on the other hand, to permit proper operation of the vortex finder in the cyclone.

The actual sizes of the openings will, of course, depend upon the size of the cyclone. In general, the area of the openings should vary substantially proportionally with the cross-sectional area of the large end of the cyclone cone. We have found that the ratios of the cross-sectional area of the cyclone to the areas of the various openings should be within the following ranges for separation of barite and lost circulation recovery material from the clay in drilling fluids.

Cyclone/inlet opening ratio _____ 20:1 to 200:1
Cyclone/underflow opening ratio _____ 50:1 to 500:1
Cyclone/overflow opening ratio _____ 10:1 to 100:1

If openings of circular cross-sectional area are used, the openings for a 3-inch cyclone should preferably be about as follows: The inlet should be about ⅜-inch in diameter, the underflow opening should be about ¼-inch in diameter, and the overflow outlet should be about ½-inch in diameter. The openings may, of course, be other than circular, for example, rectangular or elliptical, so long as their areas are within the proper ranges.

Figure 2:
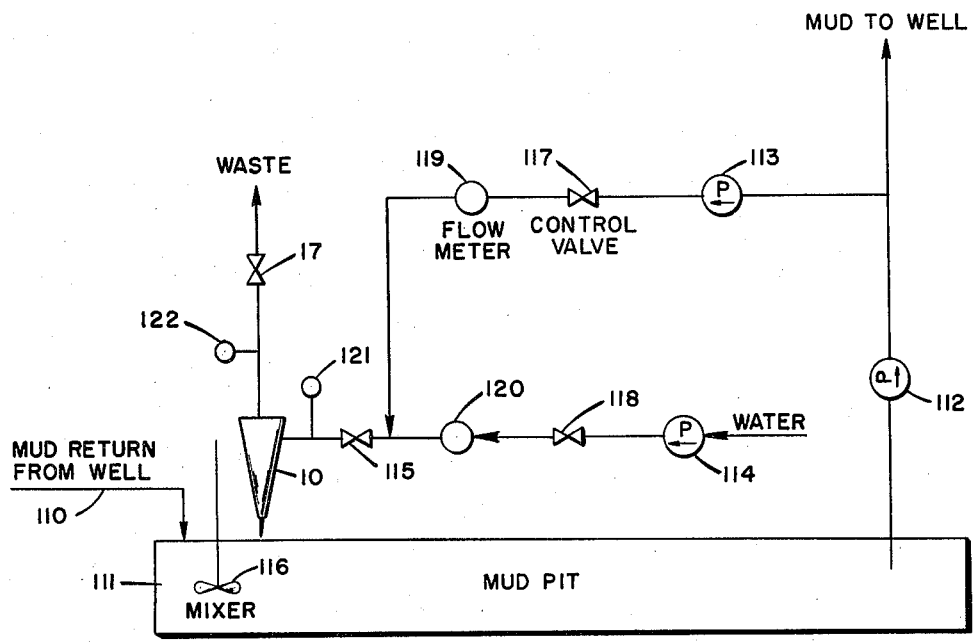
Figure 2 is a flow diagram showing one means of using a cyclone to treat a drilling fluid.

One of the simpler relations of the cyclone to the mud system of a drilling well is shown in Figure 2. In this figure, drilling fluid flows through mud return line 110 from the well to mud pit 111, preferably after passing through a shale shaker. After at least the larger bit cuttings have settled from the drilling fluid in the pit the drilling fluid is picked up by pump 112 and circulated back down the well. Drilling fluid taken either from this line or through a separate conduit from the mud pit is forced by pump 113 into the inlet of the cyclone 10. Before entering the cyclone, the drilling fluid is diluted by water from pump 114. Valve 115 in the inlet line to the cyclone is normally used for cutting off a single cyclone from a group manifolded together. It is not usually employed to control flow although it may be so used. Part of the drilling fluid entering the cyclone flows out through control valve 17 and is rejected from the mud system. The remainder of the drilling fluid flows out through the apex end of the cyclone and falls into the mud pit. Since the clay content of the underflow is usually very low, the weighting agent will settle out of this stream. Therefore, the stream should be mixed immediately with other drilling fluid as by mixer 116 to avoid this settling action. To obtain the effects of the cyclone more quickly, it is frequently advisable to discharge the underflow of the cyclone into the mud pit near the suction of pump 112. In this case, mixer 116 should, of course, also be near this point and the feed to the cyclone should be taken from a point near mud return line 110.

Pumps 113 and 114 preferably are centrifugal pumps so that control valves 117 and 118 can be employed to adjust the flow through flow meters 119 and 120 to the cyclone. Positive displacement pumps with bypass controls can also be used, however. The pumps and controls preferably are operated to impose an inlet pressure of about 50 or 60 pounds per square inch on the cyclone inlet as indicated by pressure gage 121. An inlet pressure of at least about 20 p.s.i. must be used in order to impart a sufficiently high velocity of liquid flow in the cyclone to give the desired separation. Pressures much higher than 50 or 60 pounds, for example, 150 or 200 pounds, may be employed if desired. However, since pressures of 50 to 60 pounds produce excellent results, and higher pressures accelerate wear of the cyclone, operations at the higher pressures are seldom justifiable. It should be noted that this is the pressure in the inlet line to the cyclones and is not the pressure in the cyclone itself. The pressure in the cyclone is much lower.

The outlet pressure from the apex end of the cyclone should preferably be atmospheric pressure. The outlet may, however, be submerged in a body of liquid such as drilling fluid, or it may be tied into a mud line such as the mud return line from the well. A valve may also be employed to control flow from the apex outlet. Under these conditions a pressure of as much as 10 or 20 pounds may be present in the apex outlet. In such case the inlet pressure should be increased to maintain a pressure differential of at least about 20 pounds and preferably about 50 or 60 pounds between the inlet and the apex outlet. A pressure differential at least this great should also be maintained between the inlet pressure and that in the outlet conduit from the larger end of the cyclone. The latter pressure is governed in part by the size of the apex outlet, the size of the inlet, and the inlet pressure. It is also controlled by flow control valve 17.

Even if the cyclone dimensions are within the critical limits outlined, and the operating pressures are within the limits described, still proper separation of clay solids from barite in many drilling fluids will not occur. We have found that dilution of most drilling fluids with water is necessary before barite can be separated from clay in the cyclone. The problem appears to be partly one of decreasing the number of particles in a given volume of fluid to avoid interference between the particles in the cyclone, and partly a matter of reducing the viscosity of the mud. In general, we have found that the solids content should be not more than about 20 percent by volume and preferably not more than about 10 percent by volume of the drilling fluid. The solids content may be determined by placing a known volume of drilling fluid in distillation equipment and distilling the mud to dryness. The vapors from the mud are condensed and measured. The difference between the original volume of the mud and the volume of the distillate is, of course, the volume of solids. The viscosity should not exceed about 50 centipoises as measured at about 80° F. by the Stormer viscosimeter rotating at about 600 r.p.m.

Even if the cyclone design is proper, the inlet pressure is in the desired range and the drilling fluid is diluted to the appropriate degree, the cyclone may not operate to give a suitable separation of clay from barite or other weighting materials. We have found that the ratio of flow through the two outlets must be carefully controlled to produce the desired results. In treating drilling fluid, flexibility of control is essential. For example, if a drilling fluid density of 14 pounds per gallon is being maintained to control high pressure formations the cyclone effluent containing principally barite must not have a density must less than this value or it will produce a decrease in the average density of the drilling fluid with which it is mixed. This might result in the well blowing out. If the barite effluent is too dense, on the other hand, the average density of the drilling fluid with which it is mixed may rise until the hydraulic head is sufficient on formations near the bottom of the well to fracture these formations resulting in loss of drilling fluid to the formation. Obviously it is frequently advisable to return to the mud system a treated mud having substantially the same density as that in the mud system. In this connection, the term "substantially the same" should be interpreted to mean within about a half pound per gallon of the same density. If it is desired to increase or decrease the density of the drilling fluid, however, flexibility in the operation of the cyclone will permit the cyclone to perform the dual function of separating clay from the drilling fluid and simultaneously adjusting the drilling fluid density to the desired value.

If properly operated, the underflow will contain substantially all of the barite, while the overflow will contain substantially all of the clay. The density of the underflow which contains the barite is controlled by two principal means. One is the degree of dilution of the drilling fluid. The other is the ratio of flow from the two outlets. This ratio can be controlled in several ways. The ratio of overflow to underflow volumes can be increased by increasing the size of the clay outlet or decreasing the size of the barite outlet. We have found that a highly advantageous means for controlling this ratio is a flow control valve on the outlet from the large end of the cone. This method is particularly convenient when several cyclones are manifolded together in parallel since the valve can be placed on the conduit carrying the combined overflows from all the cyclones. Thus, all cyclones can be controlled in exactly the same way so all produce the same results. Pressure gage 122 is normally provided as shown in Figure 2 to aid in adjusting valve 17 to provide the desired ratio of underflow and overflow.

Figure 3:
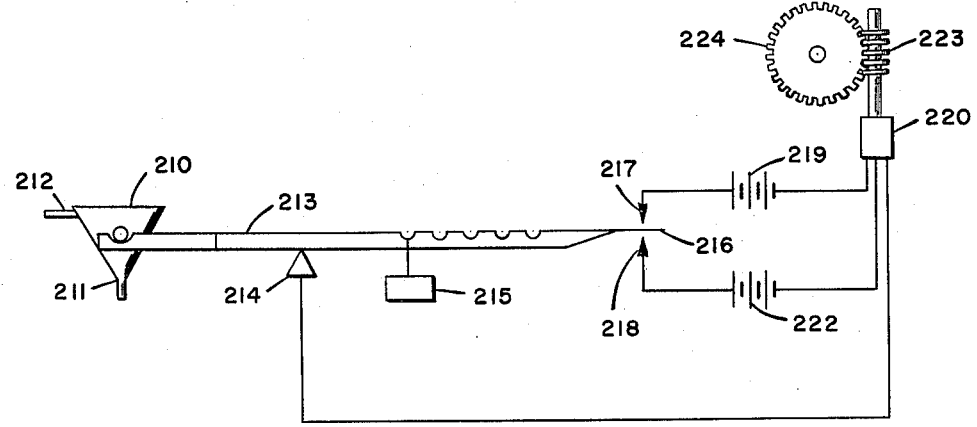
Figure 3 shows automatic means for controlling the cyclone operation to produce desired products.

Figure 3 illustrates a means for automatically controlling a cyclone or group of cyclones to produce an underflow having a constant preselected density. In Figure 3, the underflow from at least one cyclone flows into funnel 210 having bottom conduit 211 and overflow spout 212. The opening in conduit 211 is too small to pass the total volume of underflow flowing into funnel 210. Thus, the funnel is always full, but the drilling fluid is continuously changing. Funnel 210 is mounted on one end of a balance 213 on pivot 214. On the other end of the balance arm a weight 215 is provided to balance the weight of the funnel filled with drilling fluid. Weight 215 is slidable along its arm of the balance. At some point removed from the pivot on one balance arm, preferably at one end of a balance arm, an electrical contact 216 is provided. This contact may touch either contact 217 or 218 or it may be located between these contacts so it touches neither. Contacts 216 and 217 are connected through battery 219 as shown, to one winding of a reversible motor 220. Contacts 216 and 218 are connected through another battery 222 to the other winding of reversible motor 220. Reversible motor 220 drives a worm gear 223 which in turn operates cogged handle 224 of valve 17 shown in Figure 2.

In operation, if the weights on the two ends of balance 213 are balanced, contact 216 touches neither 217 nor 218. Therefore, motor 220 does not vary the setting of valve 17. If drilling fluid in funnel 210 is too dense, however, contacts 216 and 217 touch, closing the circuit through battery 219 causing motor 220 to begin closing valve 17. As this valve closes, the density of the underflow from the cyclone decreases. As the lighter drilling fluid displaces the heavier fluid in the funnel, the weight of the funnel and contents decreases until contact 216 falls away from 217 and motor 220 stops. If the drilling fluid is not heavy enough, contacts 216 and 218 come together to cause motor 220 to open valve 17 slightly. This increases the density of the effluent from the apex opening of the cyclone until funnel 210 together with its contents again balances weight 215. If it is desired to increase the drilling fluid density produced by the cyclone it is only necessary to move weight 215 out along its balance arm. The equipment then automatically adjusts the density of the underflow from the cyclone to balance the increased torque of the weight. The balance arm on which the weight slides may be calibrated in pounds per gallon of mud in the funnel to cause the arms of the balance to be in equilibrium when weight 215 is at any particular point.

Other means for determining drilling fluid density and other means for controlling the flow of fluids from the large end outlet of the cyclone will occur to those skilled in the art. The essential elements are: first, a means for sensing the density of the underflow from the cyclone, and second, means controlled by this sensing means for adjusting the ratio of flows from the two cyclone outlets to produce an underflow having the desired density.

If the dilution ratio, input pressure, and valve 17 setting remain constant the only thing which can cause the density of the underflow to vary is the nature of the mud fed to the cyclone. Normally the amount of mud fed to a bank of about 4 to 10 3-inch cyclones in parallel is a small proportion of the amount circulated in the well. Thus, in a day's time only 100 to 200 barrels of a 1,000 to 1,200 barrel mud system may be circulated through the cyclones. Therefore, the properties of the drilling fluid do not change rapidly due to the action of the cyclone, In practice, it may be satisfactory to dispense wtih automatic controls. A density measurement can be made every hour or so on the underflow. If the density is not quite that which is desired, valve 17 can be adjusted to produce an underflow of the required density. Even if the proposed automatic controls, or their equivalents, are employed, it may be unnecessary to calibrate them. The underflow density can always be easily measured to determine if any given control setting is correct or should be changed.

Although only a small portion of the volume of mud circulated in the well is normally passed through a small cyclone to separate the barite from clay and contaminants, it is sometimes desirable to increase this volume greatly. Sometimes, for example, it may be desired to convert a lime base mud to one of another type. Example VII describes such an operation in more detail. In such cases, substantially all of the circulated drilling fluid may be passed through a bank of cyclones. In such case, the underflow should generally be treated with a gel-forming agent such as starch, bentonite, sodium carboxymethyl cellulose or the like to prevent settling out of the barite.

A test should be made occasionally to determine how much barite is being lost in the overflow. A convenient simple test for this purpose is to collect a sample in a transparent container and observe the settled material after the container has stood quiescent for several hours. If the drilling fluid has been diluted to a low viscosity and gel strength, which is usually the case, the barite will settle readily and the quantity can be easily observed and estimated. If a more accurate measurement is required, a sample of the overflow may be evaporated to dryness, the specific gravity of the solids measured and the amount of barite calculated from the known specific gravity of the barite and of the clay in the area.

As previously noted, changing the degree of dilution is one means of controlling the density of the apex outlet effluent. The degree of dilution also controls the efficiency of separation of clay from barite. In general, the greater the dilution, the greater the efficiency of the separation. This means a higher percentage recovery of barite can be obtained with a constant amount of clay removal. Highly weighted drilling fluids weighing 16 or 17 pounds per gallon or more should usually be diluted by about 1 to 5 parts by volume of water to 1 part by volume of drilling fluid before the drilling fluid is injected into the cyclone. Even greater dilution may be found to be economically justifiable in many cases.

It is possible that the available cyclones may be running continuously at capacity to remove the clay solids from the drilling fluid as fast as these solids are added by the drilling operation. In this case, increased dilution will require additional cyclones, and possibly added pump capacity, to handle the increased volume. It is simply a matter of economics whether the added investment is justified. Ordinarily, it will be advisable to provide, in the beginning, excess cyclone and pump capacity. Then the cyclones may be operated intermittently to maintain the mud properties within desired limits. For example, a bank of cyclones may be operated for only 3 or 4 hours a day. Some of the cyclones may also be excluded from the system by closing valves on the inlet conduits. Examples VI and VII describe actual field uses of a bank of cyclones under these conditions.

A suggested method of starting up operations of cyclones where dilution is required is as follows: First, the water pump 114 should be started to pump water through cyclone 10 with valve 118 open. Then mud pump 113 should be started with valve 117 substantially closed. Valve 118 is then partially closed and 117 is partially opened to provide the proper ratio of water to mud, as indicated by flow meters 119 and 120. The total flow through both meters is next adjusted to provide the desired input pressure to the cyclones. The automatic control equipment shown in Figure 2 or its equivalent can then be set in operation. If the automatic control equipment is not used, then the density of the underflow should be measured, for example by a mud balance. Control valve 17 can then be adjusted to increase or decrease the density of the underflow as desired until the required density is reached. The barite content of the overflow should then be checked. If the barite content is too high, the water-to-mud ratio of the feed should be increased and the adjustment procedure repeated until the barite content of the waste stream is below an acceptable maximum. If the barite content is very low in the waste stream, reduction of the water-to-mud ratio should be considered to avoid the waste disposal problem which may arise when large volumes of dilution water are introduced.

Figure 4:
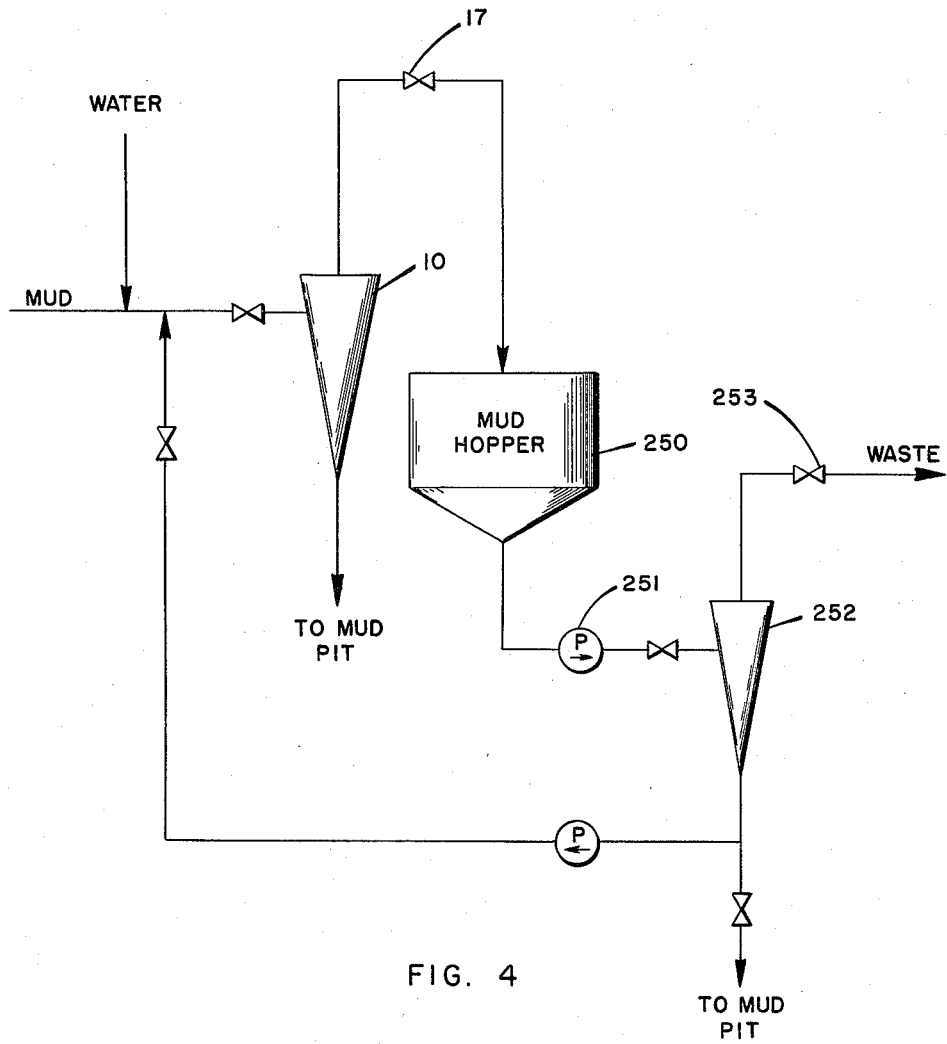
Figure 4 is a flow diagram of a system employing two cyclones in series for efficient separation of clay solids from weighting materials.

Parallel operation of the cyclones has been mentioned. Single cyclones, or banks of cyclones in parallel, can also be operated in series. Figure 4 illustrates one possible series operation. In this system cyclone 10 operates as in Figure 2. The overflow, however, passes to a second cyclone 252. Although the inlet of cyclone 252 may be connected directly to the large end outlet from cyclone 10, preferably the overflow from cyclone 10 passes to a hopper 250 from which pump 251 draws feed for second cyclone 252. Control valve 253 may be adjusted to produce an underflow from cyclone 252 having the same density as that from cyclone 10. If so operated, the underflow from cyclone 252 can be allowed to flow directly to the mud pit as shown. It will frequently be advisable to adjust control valve 253 to cause more efficient recovery of barite from the apex outlet of cyclone 252 even though the density of this stream may be considerably below that of the comparable stream of cyclone 10. If such a low density effluent is allowed to flow to the mud pit, then the density of the underflow from cyclone 10 should be adjusted to a higher value to maintain the density of the mixed effluents near the density of the mud in the pit. It is also possible to return the underflow from cyclone 252 to the feed of cyclone 10 as shown in Figure 4. Although the same size cyclones may be used in series as shown in Figure 4, the second cyclone should be considerably smaller than the first. Both however, should be within the size limits outlined above.

If lost circulation recovery material is introduced into the drilling fluid and the shale shaker is bypassed, it is only necessary to screen the mud before it is introduced into the cyclone. This prevents plugging of the cyclone by the large particles of shale or lost circulation recovery material. Preferably a large screen basket is simply placed around the inlet, in the mud pit, to the pump feeding mud to the cyclone. The particles of lost circulation recovery materials are thus retained in the drilling fluid and continue to perform their function. The cyclone separates the barite from the clay in the usual manner. Thus, both the lost circulation recovery material and the barite can be retained in the drilling fluid while only the finely divided and colloidal clay solids are rejected. Only the lost circulation recovery material which will not pass through the screen may be retained, however. For example, if ground walnut shells are employed for stopping loss of circulation, not only the large particles but also the fine ones down to about 100 mesh size should be retained in the drilling fluid. By 100 mesh particles we intend to include those particles which will almost, but not quite pass a No. 100 screen in the U.S. Standard Fine Sieve Series, as described, for example, in the Handbook of Chemistry and Physics, 36th Edition, page 3079, published by the Chemical Rubber Publishing Company. Since the specific graivty of these walnut shell particles is only about 1.3 or 1.4 compared to water, whereas the barite specific gravity may be about 4.2 or 4.3, the barite and walnut shells may be separated by the cyclone. If such separation occurs, the fine walnut shells may be lost in the cyclone overflow.

To insure recovery in the underflow of both barite and ground walnut shells, a cyclone no larger than 4 inches in diameter should be employed. In addition, the drilling fluid entering the cyclone should be diluted until the overflow has a density no greater than 9 pounds per gallon. Preferably, the density of this stream should not be more than about 8.8 pounds per gallon. Even small cyclones operating on highly diluted drilling fluid cannot recover finely divided lost circulation recovery material very much lighter than walnut shells. Most vegetable fibers, for example, when saturated with water, have a density very close to that of water. Finely divided particles of such materials are, of course, lost with the clay in the overflow from the cyclone.

Fibrous and lamellated lost circulation recovery materials are generally much too weak to be effective in finely divided form. Therefore, there is usually no need to recovery the more finely divided particles of such material. It is possible, however, to recover most of them, if desired, by passing the drilling fluid over a shale shaker having a very fine screen such as No. 30 or 40. The material retained on this screen can then be returned to the mud pit. Only the mud containing particles of lost circulation recovery material finer than 30 or 40 mesh size will then pass to the cyclone where they will be lost in the overflow. Even drilling fluid containing lost circulation recovery materials having a higher density, such as walnut shells, mica, cellulose flakes, and the like, may also be screened through a fine screen before treatment by the cyclone to decrease the load on the cyclone.

If a cyclone is selected and operated to recover 100 mesh walnut shells with the barite, it will also recover 100 mesh shale particles. Normally these particles will do little harm. Only the very finely divided clay or shale in or near the colloidal range is usually objectionable. It is true that the shale particles recovered with the barite and walnut shells may eventually become dispersed into particles in the objectionable range, but when this occurs the cyclone removes them from the mud stream. It will be apparent that the use of a bank of small cyclones can eliminate the need for a shale shaker in many cases.

Occasionally, the shale bit cuttings in the range from the largest down to about 100 mesh size reach objectionable concentrations. When this occurs, a cyclone having a diameter between about 6 inches and about 16 inches can be employed to remove such shale bit cuttings from the mud while removing only a very small amount of barite, lost circulation recovery material, and clay. This cyclone should not be operated as described above for separation of barite or lost circulation material from clay. To separate shale cuttings and sand from the drilling fluid the mud should not be diluted. Since the capacity of the cyclone is large, the entire circulating drilling fluid stream may be passed through two or three of these large cyclones in parallel. Since only the bit cuttings are removed in the cyclone underflow, the overflow will be substantially the same as the drilling fluid entering the well. If properly designed and operated, the cyclone will remove most of the bit cuttings retained on a No. 100 screen. Many of those which will pass a No. 100 screen and be retained on a No. 325 screen will also be included in the underflow with the larger shale and sand particles. This means that very little shale in a particle size range above the colloidal range will remain in the drilling fluid to be dispersed to smaller size. Therefore, the colloidal clay solids content of the drilling fluid will increase very slowly, if at all. This is particularly true where water is being added continuously to the drilling fluid to make up for losses of drilling fluid to formations drilled and in the underflow from the large cyclone. Thus, the large cyclone may eliminate the need for the small one to remove dispersed clay solids.

A combination of large and small cyclones gives complete control of shale particles and dispersed clay without substantially affecting the barite or lost circulation recovery material. This combination entirely eliminates the need for shale shakers. The large cyclone rejects the clay and shale particles down to around 100 or 200 mesh size through the underflow while the barite, lost circulation recovery material, and clay are retained in the drilling fluid passing out of the overflow. The small cyclone, on the other hand, rejects the finer clay and shale particles in the overflow, while the lost circulation recovery material and barite are retained in the underflow.

Only certain lost circulation materials can be retained in the mud system when it pases through a large and a small cyclone in series, the large cyclone being operated to reject bit cuttings and sand, and the small cyclone being operated to reject finely divided clay particles and contaminants. As previously mentioned, the specific gravity of granular materials such as ground walnut shells must be at least about 1.3 compared to water and they must be retained on a No. 100 screen or they will be rejected with the finely divided clay solids in the overflow from the small cyclone. Such granular particles must not have a size much larger than will pass a number 10 screen, or a specific gravity greater than about 2.3 compared to water, or they will be rejected with the bit cuttings and sand in the underflow stream from the large cyclone.

Another class of lost circulation materials which can be recovered is the class of lamellated materials such as mica. Due to the flat, platelike shape of particles of such materials, different limits apply from those applicable to granular materials. Lamellated particles passing a number 10 screen and retained on a number 100 screen can be recovered if their specific gravity is in the range of about 2.5 to about 3.5 compared to water.

Both the term granular and the term lamellated are somewhat arbitrary terms. In order for the above limits to apply, the term granular shape should be interpreted to mean the shape of a particle having a length or width no more than about twice the thickness. The term lamellated shape should be interpreted to mean the shape of a flake-like particle having a thickness no greater than about $\frac{1}{10}$ the width or length of the particle. It will be apparent that between these granular and lamellated shapes a range of shapes exists in which the particles are neither granular nor lamellated. Few lost circulation recovery materials are now used which have particle shapes in this intermediate range. For such materials of intermediate particle shape as do exist, the range of specific gravities should also be intermediate between those of granular and lamellated particles.

To separate bit cuttings and sand from drilling fluid, the cyclone operates in a somewhat different manner from the way it functions to separate barite from clay. As previously noted, the drilling fluid should not be diluted before entering the cyclone. In addition, the rates of flow should be different. The size of the cyclone and relative sizes of the openings should also be somewhat different when the problem is separation of cuttings and sand from drilling fluids. The large cyclones for separating sand and cuttings from muds should have a diameter at the large end of the cone of about 6 to 16 inches. The length of the cone excluding any cylindrical portions on the top and bottom, should be between about 2 and about 6 times the maximum diameter. The input volume of mud should be between about 50 and about 500 gallons per minute at input pressures of about 20 to about 100 pounds per square inch for a cyclone 8-inches in diameter, for example. The pressure range should be about the same for cyclones of other sizes, but the volume range should be varied substantially proportionally to the cross-sectional area of the cyclone. The ratio of the cross-sectional area of the large end of the cyclone to the area of the various openings should be within the following ranges:

Cyclone/inlet opening ratio _____ 15:1 to 150:1
Cyclone/underflow opening ratio _____ 70:1 to 700:1
Cyclone/overflow opening ratio _____ 5:1 to 50:1

The principal reason for the changes in dimensions over those used for separation of barite and lost circulation recovery materials from clay is that only a very small percentage of the total mud introduced into the cyclone should be permitted to flow out of the underflow outlet. The underflow stream should be adjusted to permit only about 1/10 to about 2 percent of the total fluid to be rejected as the underflow. In extreme cases, as much as about 10 percent may be rejected in the underflow. As noted in Examples VIII and IX, one convenient way of controlling the volume of this effluent is to submerge the apex opening of the cyclone. This has the advantage not only of decreasing the volume of drilling fluid lost in this rejected stream, but also improves the recovery of lost circulation recovery material, and tends to prevent plugging of the underflow opening of the cyclone. For an 8-inch cyclone the openings should be about as follows: The inlet opening should be about 1¼ inches in diameter, the underflow opening should be about ½ inch in diameter, and the overflow opening should be about 2½ inches in diameter. The openings may, of course, be other than circular, for example, rectangular or elliptical, so long as their areas fall within the proper ranges.

Our invention will be better understood from consideration of the following examples.

EXAMPLE I

A drilling fluid was prepared in the laboratory containing the following ingredients:

Ingredient: Amount
 Barite _____ lbs__ 675
 Bentonite _____ lbs__ 2
 El Paso clay _____ lbs__ 100
 Sodium acid pyrophosphate ____ lbs__ 1.75
 Caustic _____ lbs__ .75
 Quebracho _____ lbs__ .75
 Water _____ gals_ 37

The density of this drilling fluid was 17.8 pounds per gallon and the viscosity was 185 centipoises as measured on a Stormer viscosimeter as described in API Code No. 29, Third Edition, May 1950 (tentative). This drilling fluid was pumped into a 3-inch cyclone such as that shown in Figure 1. The cyclone had the following dimensions:

Maximum internal diameter _____ 3″.
Length of conical portion _____ 11″.
Size of inlet _____ ⅜″ x 5/16″.
Size of apex outlet _____ ¼″ diameter.
Size of large end outlet _____ ½″ diameter.
Length of straight end at apex _____ ⅞″.
Length of vortex finder tube inside cyclone _____ 1″.

Both the input and overhead outlet pressures were varied. The density of the overhead stream from the cyclone was measured as an indication of whether the barite was being forced out of the apex outlet. The results of the test are presented in Table I.

Table I

[Mud density, 17.8. Viscosity, 185 cpse. Solids, 39.5= by volume.]

| Input Pressure, p.s.i.g. | Overhead Pressure, p.s.i.g. | Overflow Density, lb.-gal. |
|---|---|---|
| 50 | 15 | 18+ |
| 50 | 20 | 18+ |
| 50 | 25 | 18+ |
| 70 | 30 | 18+ |

It is obvious from this table that the cyclone was ineffective in separating barite from the drilling fluid passing out the large end of the cyclone, since the density of this stream was approximately the same as the input stream.

The drilling fluid was diluted slightly by the addition of about 14 gallons of water to decrease the solids content and the viscosity. This diluted drilling fluid was then pumped through the cyclone. The results are presented in Table II.

Table II

[Mud density, 16.0 lb.-gal. Viscosity, 53 cpse. Solids, 32.2= by volume.

| Input Pressure, p.s.i.g. | Overhead Pressure, p.s.i.g. | Overflow Density, lb.-gal. |
|---|---|---|
| 10 | 0 | 15.8 |
| 10 | 2.5 | 15.8 |
| 10 | 6 | 16.1 |
| 20 | 0 | 15.7 |
| 20 | 10 | 16.0 |
| 20 | 15 | 16.1 |
| 40 | 0 | 15.6 |
| 40 | 10 | 15.55 |
| 40 | 20 | 15.7 |
| 40 | 30 | 16.2 |
| 60 | 0 | 15.4 |
| 60 | 20 | 15.15 |
| 60 | 30 | 15.25 |
| 60 | 40 | 15.7 |
| 70 | 0 | 15.25 |
| 70 | 20 | 15.0 |
| 70 | 40 | 15.3 |
| 77 | 0 | 15.2 |
| 77 | 20 | 14.85 |
| 77 | 40 | 14.9 |
| 77 | 50 | 15.4 |

Several points are illustrated in Table II. First, it is apparent that as soon as the differential between the input and overhead outlet of the cyclone drops below about 20 pounds, the cyclone becomes ineffective to remove barite from the overflow and thus reduce the density of this stream. Second, if the overflow density is compared to the input pressure for a given overhead pressure, it is apparent that the efficiency increases with increased input pressure. For example, at zero overhead pressure, overflow densities of 15.8, 15.7, 15.6, 15.4, 15.25, and 15.2 were obtained for input pressures of 10, 20, 40, 60, 70, and 77 pounds, respectively. Third, the results at 77 pounds input pressure show that so long as the input pressure is sufficiently high the density of the overhead decreases with increase of overhead pressure as more of the barite is forced out the apex end of the cyclone by the higher pressure in the cyclone.

Finally, this drilling fluid was again diluted by the addition of about 25 gallons of water to decrease the solids content and viscosity even farther. This diluted drilling fluid was pumped through the cyclone. The results are presented in Table III.

Table III

Mud density, 14.1 lb./gal. Viscosity, 18 cpse. Solids, 24.3% by volume.]

| Input Pressure, p.s.i.g. | Overhead Pressure, p.s.i.g. | Overflow Density, lb./gal. |
|---|---|---|
| 30 | 0 | 13.2 |
| 30 | 10 | 12.65 |
| 30 | 15 | 12.75 |
| 30 | 20 | 14.2 |
| 50 | 0 | 13.25 |
| 50 | 10 | 12.27 |
| 50 | 20 | 12.4 |
| 50 | 30 | 13.05 |
| 68 | 0 | 12.95 |
| 68 | 10 | 12.65 |
| 68 | 20 | 12.2 |
| 68 | 30 | 12.0 |
| 68 | 40 | 12.5 |

These data again show that the pressure differential between input and overhead pressures must be maintained above at least about 10 and preferably above about 20 pounds per square inch. The data also show, again, the greater efficiency at higher input pressures and the lower overflow densities at increased overhead pressures as more of the barite is forced into the underflow.

A sample of the underflow was taken with the cyclone operating at 68 p.s.i.g. input and 30 p.s.i.g. overhead pressures. This underflow had a density of 17.2 pounds per gallon, demonstrating the ability of the cyclone to concentrate the barite in the underflow to increase the density back nearly to the 17.8 pounds per gallon of the original drilling fluid prior to dilution. The underflow volume was 4.3 gallons per minute while the overflow volume was 6.3 gallons per minute.

EXAMPLE II

Two drums of lime base drilling fluid were obtained from a drilling well near Houma, Louisiana, on the Gulf of Mexico coast. The drilling fluid in one drum had a density of 16.05 pounds per gallon and in the other drum a density of 16.7 pounds per gallon. Both had a viscosity of 167 centipoises, and a fluid loss of 7 cc. in 30 minutes, the viscosity and fluid loss being measured as described in API Code 29. The solids content was about 35 percent by volume. An effort was made to separate the clay and barite in this drilling fluid by pumping it without dilution through the cyclone described in Example I. No separation occurred as indicated by the density of the underflow and overflow. Both were the same as the density of the input stream. The drilling fluid was then diluted with 3 gallons of water per gallon of drilling fluid to decrease the solids content and the viscosity. This diluted fluid was then pumped through the cyclone. The results are presented in Table IV. Also presented in this table are the results when the original drilling fluid was diluted with 4 gallons of water per gallon of drilling fluid before pumping through the cyclone. All the data in Table IV were obtained using the drilling fluid weighing 16.05 pounds per gallon.

*Table IV*

| Dilution, water/mud | Press., p.s.i.g. | | Underflow | | | Flow Rates, g.p.m. | |
|---|---|---|---|---|---|---|---|
| | Input | Ovhd | Density, lb./gal. | Viscosity, cpse. | Fluid Loss, cc./30 min. | Underflow | Overflow |
| 3/1 | 47 | 5 | 18+ | | | | |
| 3/1 | 47 | 8 | 17.5 | | | | |
| 3/1 | 47 | 10 | 17.2 | | | | |
| 3/1 | 47 | 12 | 15.95 | 25 | 32 | 2.04 | 7.75 |
| 4/1 | 42.5 | 10 | 16.85 | | | | |
| 4/1 | 43 | 12 | 15.2 | | | | |
| 4/1 | 43 | 10.5 | 15.95 | 17 | 54 | 1.56 | 8.0 |

The possibility of returning to the mud pit a substantially clay-free slurry of barite having substantially the same density as the mud in the pit will be apparent from the above data. The substantial reduction in clay is indicated by the decrease in viscosity from 167 to 25 and 17 for the 3/1 and 4/1 dilution ratios respectively. The increase in fluid loss from 7 to 32 and 54 for the 3/1 and 4/1 dilution ratios respectively, also indicates the great reduction in clay content in the underflow.

In similar tests with the mud sample weighing 16.7 pounds per gallon, samples of the overflow and underflow were taken and analyzed for clay and barite content by measuring the weight and volume of a mud sample, evaporating to dryness, weighing the solids, measuring their density and calculating the water, barite and clay contents. While the results were somewhat erratic, they demonstrated that the clay content of the underflow was less than half that of the original drilling fluid before dilution, while the barite content and the density were at least as great as in the undiluted drilling fluid.

EXAMPLE III

The 16.7 pound per gallon sample of drilling fluid described in Example II was diluted with 2.5 gallons of water per gallon of drilling fluid and passed through the cyclone described in Example I. The input pressure was 46 p.s.i.g. and the overhead pressure was 14 p.s.i.g. The overflow volume rate was 8.3 gallons per minute while the underflow volume rate was 2.1 gallons per minute. The densities of the overflow and underflow were 9.25 and 16.8 pounds per gallon respectively. Various amounts of the underflow were mixed with the original mud to produce mixtures such as would be produced in the field by treating various percentages of the total drilling fluid in the cyclone. A sample of the original drilling fluid was poured into sealed cylinders and placed in a furnace at 300° F. for 16 hours. At the end of this time the cylinder was cooled to room temperature of about 80° F., the top was removed and the shear strength of the drilling fluid was measured by the Shearometer test described in API Code 29, Third Edition, May 1950 (tentative). The result of the test is reported in Table V together with the results of similar tests with two mixtures of the original drilling fluid with the cyclone underflow.

*Table V*

| Volume Drilling Fluid, ml. | Volume Underflow, ml. | Shear Strength, lb./100 ft.$^2$ |
|---|---|---|
| 300 | 0 | 4,200 |
| 261 | 39 | 1,000 |
| 187.5 | 112.5 | 190 |

It will be apparent from the data in Table V that the tendency of the mud to set at high temperatures can be greatly decreased by diluting a portion of the drilling fluid and passing it through a small cyclone to decrease the clay content of the total volume of drilling fluid.

EXAMPLE IV

A drilling fluid was prepared containing the following ingredients:

| | |
|---|---|
| Bentonite | 14.5 lb./bbl. |
| Barite | 500 lb./bbl. |
| Shale | 3 lb./bbl. −4+40 size. |
| | 3 lb./bbl. −40+100 size. |
| Water | 38 gallons. |

In mixing this mud, some of the shale particles dispersed to smaller sizes. Screen analysis showed the mud to contain 1.74 lb./bbl. shale particles in the −4 to +40 range, while 0.92 lb./bbl. were in the −40 to +100 range. In this connection, −4 to +40 means the particles would pass a number 4 screen but be retained on a number 40 screen, these screen sizes being U.S. Standard Sieve Series (1940), Fine Series Size as described, for example, on page 3079 of Handbook of Chemistry and Physics, 36th Edition, Chemical Rubber Publishing Co.

This drilling fluid was pumped into a cyclone having the following dimensions:

| | |
|---|---|
| Maximum internal diameter | 8″. |
| Length of conical portion | 27″. |
| Size of inlet | 1¼″ diameter. |
| Size of large end outlet | 2½″ diameter. |
| Size of apex outlet | ½″ diameter. |
| Length of straight end at apex | 1″. |
| Length of vortex finder tube inside cyclone | 4″. |

Both the input and overhead pressures were varied slightly to change the ratio of volumes of underflow and overflow streams. The results are presented in Table VI.

Table VI

[Density, 15.8 lb./gal. Viscosity, 98 cpse. Solids, 28% by volume. Shale, 1.74 lb./bbl. −4 +40, 0.92 −40 +100]

| Pressures, p.s.i.g. | | Underflow | | | | | Overflow | | | | |
|---|---|---|---|---|---|---|---|---|---|---|---|
| Input | Overhead | Density, lb./bbl. | Visc., cpse. | Rate, g.p.m. | Cuttings, lb./bbl. | | Dens., lb./bbl. | Visc., cpse. | Rate, g.p.m. | Cuttings, lb./bbl. | |
| | | | | | −4 +40 | −40 +100 | | | | −4 +40 | −40 +100 |
| 38 | 0 | 16.75 | 175 | 1.47 | 21.2 | 4.1 | 15.8 | 97 | 100 | Trace | 0.3 |
| 40 | 5 | 16.65 | 110 | 2.22 | 2.92 | 1.93 | 15.8 | 89 | 95 | Trace | 0.22 |

It will be apparent that the 8-inch cyclone, operating on undiluted drilling fluid, is capable of rejecting substantially all the shale particles retained on a number 40 screen, together with most of the particles passing a number 40 screen but retained on a number 100 screen. These shale particles are rejected in the underflow in a stream which is only about 2 percent of the total mud volume. Since the overflow, which is about 98% of the total volume, has substantially the same density as the input stream, it is apparent that little barite is lost in the underflow with the cuttings.

The following lost circulation materials were added to the drilling fluid:

| | Lbs. |
|---|---|
| Fine mica | 3 |
| Cellophane flakes | 1 |
| Tuf-Plug fine | 2 |

Most of the fine mica would pass a number 40 screen. The cellophane flakes averaged about ½ inch in maximum dimension. The Tuf-Plug fine was walnut shells, ground to pass a 30 mesh screen and be retained on a 100 mesh screen.

When this drilling fluid was passed through the 8-inch cyclone, substantially all the cellophane and Tuf-Plug appeared in the overflow together with the mica except for a little coarse mica which appeared in the underflow.

EXAMPLE V

The drilling fluid described in Example IV, after the mica, cellophane, and Tuf-Plug were added, was diluted with 3 gallons of water per gallon of mud and introduced into the 3-inch cyclone described in Example I. A portion of the drilling fluid was also diluted to 4 gallons of water per gallon of drilling fluid and pumped through the 3-inch cyclone at several overhead pressures to control the volume ratio of the underflow streams with corresponding control of the densities of those streams. The results are reported in Table VII.

overflow is less than about 9.0 and preferably less than about 8.8 pounds per gallon.

EXAMPLE VI

A manifold of ten 3-inch cyclones such as the one described in Example I were employed to remove clay and reclaim barite in a drilling fluid being used to drill a well in the Big Lake Field in Louisiana. The drilling fluid was weighted to 12.5 pounds per gallon and was treated with sodium carboxymethyl cellulose, caustic and quebracho. Because of the large amount of hole drilled each day and the fact that no protective string had been set in the well, the viscosity of the mud had become impossible to control unless large amounts of water and chemicals were added continuously while drilling. The viscosity of the mud returns while drilling measured as high at 150 seconds (Marsh funnel) and after trips, the viscosity was often too high to measure. Daily treatment of 200 to 400 sacks of barite, 200 to 600 lbs. of chemicals, and 100 lbs. of CMC at a cost of $500 to $950 per day was required to lower the viscosity and maintain a weight of 12.4 lbs./gal.

The drilling fluid was picked up from the mud pit by a pump. Water was picked up by another pump. The metered outputs of both streams were mixed in a ratio of 4 gallons water per gallon of drilling fluid and introduced into 8 of the 10 cyclones in parallel at an input pressure of 50 p.s.i.g. The overhead pressure was adjusted and finally set at about 14 p.s.i.g. The overflow, weighing 8.6 pounds per gallon was rejected to waste. The underflow, weighing 12.8 pounds per gallon was discharged directly into the mud pit over which the cyclones were mounted. Mud guns and an electric motor driven mixer were employed to mix the discharges from the cyclones into the mud in the pits. The underflow density was maintained at a slightly higher value than that of the mud in the pits to compensate for small streams of water suction of the centrifugal pump in the reserve pit.

The total volume of the mud system was about 1200

Table VII

| Dilution, Water/Mud | Input Press., p.s.i.g. | Underflow | | Overflow | | Comments |
|---|---|---|---|---|---|---|
| | | Vol., g.p.m. | Density, lb./gal. | Vol., g.p.m. | Density, lb./gal. | |
| 3/1 | 45 | 1.61 | 16.3 | 8.45 | 9.1 | All mica, most of cellophane in underflow, most Tuf-Plug is overflow. |
| 4/1 | 43 | 1.29 | 16.4 | 8.7 | 9.0 | Same as above. |
| 4/1 | 43 | 1.67 | 14.8 | 7.6 | 8.8 | All mica, and Tuf-Plug and most cellophane in underflow. |

The data and comments in Table VII indicate that the more dense lost circulation recovery materials such as mica and cellophane can be recovered easily in the underflow from the 3-inch cyclone even when the overflow density is 9 pounds per gallon or more. Materials such as ground walnut shells, however, having a specific gravity of only 1.3 to 1.4 compared to water, can be forced into the underflow only when the density of the barrels. About 30 barrels of mud per hour was diluted with about 120 barrels of water and pumped to the cyclones while they were operating. By running the cyclones at this rate for about 4 hours each day, the consumption of barite was almost eliminated and the mud viscosity was maintained at 60 seconds without chemical treatment. Estimated savings in barite and chemicals effected by the use of 8 cyclones for 14 days, operating an average of 4 hours/day, amounted to a value of $8,725, which was $2,725 more than the total cost of the cyclones and the 2 pumps and diesel engines feeding the cyclones.

The cyclones were employed twice to recover a total of approximately 300 sacks of barite from the reserve pit. The only changes required in the setup were to place the suction of the centrifugal pump in the reverse pit.

For short periods of time, the cyclone was operated with water-mud ratios of 1:1 and 2:1. At these ratios, the overflow or reject mud weighed more than 9 lbs./gal. indicating loss of barite. A drop in the mud level in the pits substantiated the loss of barite.

EXAMPLE VII

During a 20-day period the bank of 10 three-inch diameter cyclones described in Example VI, were used on a barge near Buras, La., to maintain a low solids mud and to convert the mud from a high pH lime base mud to a low pH phosphate-CMC mud at a savings of approximately $10,000 in clay and barite.

While cutting a window in the casing at a depth of 11,941 feet, a decision was made to convert to a low pH mud because of the hole difficulties which had been experienced with the high pH mud being used. Rather than discard the old mud and mix new mud costing approximately $11,000, the cyclones were employed to reject the chemicals and clay and reclaim the barite. The cyclones were operated for approximately 40 hours during one three-day period. The mud weight was maintained at 14.5 lbs./gal. As the clay solids and chemicals were rejected from the mud, $640 worth of CMC and gel were added to keep the barite in suspension. When the entire system (1580 barrels) had passed through the cyclones with a loss of 180 barrels of mud, treatment ceased. Tests showed that the lime content had been reduced to a negligible concentration although the pH was 12.5.

After the window was cut and drilling continued, the cyclones were again placed in operation a few hours daily. A few days after drilling was started again the pH of the mud had been lowered to 11.0 without any treatment other than with the cyclones.

The biggest portion of the 180 barrels of mud lost to the overflow during cyclone treatment was lost because of insufficient dilution of the mud passing through the cyclones during the first two days of operation. On the third day, using a dilution ratio of three parts water to one part mud, the cyclones were operated continuously for 12 hours with a loss of only 20 barrels of mud. Other than for filling the fuel tanks on the pump engine and occasionally checking the mud weight, the cyclones ran unattended.

Subtracting the estimated cost of gel, clay, CMC and diesel oil, approximately $10,000 were saved by converting the mud with the cyclones.

This drilling fluid contained as lost circulation recovery material, ground walnut shells which would pass a number 30 screen and be retained on a number 100 screen. These were easily visible in the drilling fluid. Their presence could also be detected by rubbing the mud between a finger and thumb. The shells were particularly easily detected in the filter cake formed on a filtrate rate test. All these tests failed to detect more than a small trace of nutshells in the overflow from the cyclones. The underflow, on the other hand, was so filled with nutshells that it was difficult to get the lid on the mud cup of a mud weight balance in order to take the weight of the underflow.

EXAMPLE VIII

The 8-inch cyclone described in Example IV was employed to treat drilling fluid used in drilling a well in the Duncan area of Oklahoma, except that the size of the bottom orifice was changed occasionally. A shale shaker was being employed but in spite of its use the solids content of the drilling fluid had increased to 14 percent by volume and the viscosity had increased to 315 seconds (Marsh funnel). About 5 barrels per minute, one-half the total circulated drilling fluid stream passing through the shale shaker, was pumped through the 8-inch cyclone without dilution. The results are presented in Table VIII. The well was a wildcat so the mud program was very erratic. Both barite and bentonite were occasionally added as well as chemicals of various sorts. The operation of the cyclone was intermittent as the erratic operation permitted.

*Table VIII*

| Total Hrs. of Oper. | Cyclone Press., p.s.i. | | Orifice size, in. | Input Mud | | | | | | | | Reclaimed Mud | | | | | | | Rejected Mud | |
|---|---|---|---|---|---|---|---|---|---|---|---|---|---|---|---|---|---|---|---|---|
| | | | | Flow Rate, g.p.m. | Dens., lb./gal. | Vis., Sec. | Solid Cont., Percent vol. | Screen Anal., lb./bbl. | | | | Dens., lb./gal. | Vis., Sec. | Solid Cont., Percent vol. | Screen Anal., lb./bbl. | | | | Flow Rate, g.p.m. | Dens., lb./gal. |
| | Input | Back | | | | | | +60 +100 | −60 +100 | −100 +200 | −200 +325 | | | | +60 | −60 +100 | −100 +200 | −200 +325 | | |
| ½ | 40 | 0 | ½ | +200 | 10.3 | 315 | 14 | | | | | 10.0 | 170 | 13 | | | | | 2 | +18 |
| 29 | 25 | 0 | ½ | −200 | 10.3 | 214 | 13 | .48 | .68 | 2.40 | 11.2 | 10.1 | 185 | 12 | 0 | .22 | 1.70 | 3.60 | 2 | 16.6 |
| 29 | 25 | ½ | 1½ | −200 | 10.3 | 214 | 13 | .48 | .68 | 2.40 | 11.2 | 10.2 | 178 | 12.5 | 0 | .30 | 2.83 | 5.27 | −¼ | +18 |
| 30 | 25 | +0 | ⁵⁄₁₆ | −200 | 10.2 | 218 | | .48 | .68 | 2.40 | 11.2 | 10.0 | 157 | | 0 | .39 | 1.61 | 3.86 | 1 | 14.6 |
| 80 | 35 | ½ | 1½ | +200 | 10.4 | 220 | 13 | .14 | .23 | 1.82 | 11.64 | 10.3 | 160 | 12 | 0 | .22 | 1.39 | 4.40 | −¼ | 13.8 |
| 83¹ | 38 | ¼ | ¼ | +200 | 10.4 | 263 | 12 | .13 | .33 | 2.65 | 15.64 | 10.3 | 181 | 12 | 0 | .17 | 1.58 | 5.4 | ½ | 12.5 |

¹ Reject orifice was submerged in fluid to reduce the volume of mud lost.

The operability of the cyclone at input pressures from 25 to 40 p.s.i. is demonstrated. Little back pressure was imposed in the overhead outlet to avoid loss of excessive volumes out the underflow. When the underflow outlet was submerged, however, a little pressure was necessary to cause any flow out the apex end. An important fact is the greatly reduced volume of the underflow with very little decrease in effective removal of shale and sand from the reclaimed mud in the overflow.

In view of the frequent addition of barite and bentonite to the mud, the absolute values of density, viscosity and solid content of the mud is not considered particularly significant. The comparison of the properties of the input mud to those of the reclaimed mud is the important point to be noted. Only a small decrease in density and solids content is to be noted upon passage of the mud through the cyclone. Thus, there could have been very little removal of barite or other finely divided material from the mud. The decrease in viscosity, however, shows that the solids which were removed were of such a nature to be responsible for a considerable portion of the total viscosity. A study of the screen analysis of the input and reclaimed muds indicates the nature of the solids removed. It is apparent that the cylone removed all the particles of sand, shale, and the like, which are sufficiently coarse to be retained on a number 60 screen. Some of the particles passing a number 60 and retained on a number 100 screen were also rejected. Even a small portion of the particles in the 100 to 200 range were removed. A very large amount of the particles passing a number 200 screen and retained on a number 325 screen were removed. The reason for this apparently anomalous behavior was the presence in the drilling fluid of a large amount of very fine sand in the 200 to 325 range. These sand particles, being of a rounded shape and of a somewhat higher density than the shale particles, were removed even more effectively than the slightly larger, but lower density and somewhat lamellated shale particles.

By use of the cyclone, the average daily cost of treating chemicals was decreased by about $20.00. Also, an average of about 10 barrels of mud per day was reclaimed which normally would have been lost from jetting. Since the value of this particular mud was about $3.00 per barrel, the total daily savings from use of the 8" cyclone was about $50.00.

EXAMPLE IX

A well was drilling in Lipscomb County, Texas. Lost circulation is a considerable problem in this area so cottonseed hulls were being maintained in the drilling fluid at all times by bypassing the shale shaker. Because of the same lost circulation problem, however, it was important that the mud density be maintained at a low value of around 9 to 9.4 pounds per gallon. Bypassing of the shale shaker resulted, of course, in a rapid increase in mud solids with a corresponding increase in density. Considerable jetting and dilution of the mud was, therefore, necessary. The 8-inch cyclone described in Example IV was installed on this rig and one-half the total circulated mud stream was passed through the cyclone. In a 2-day period, the mud density was decreased from 9.7 to 9.4 pounds per gallon without any dilution of the drilling fluid in spite of continued drilling. The sand content was decreased from about 3.0 percent to about 0.5 percent. The presence of the cyclone was fortunate since a breakdown of water pumping equipment would have caused shutdown of the drilling operations if the cyclone had not been available to remove the bit cuttings. During the next few days only intermittent operation of the cyclone was required to maintain the weight in the desired range.

Due to the presence of the cottonseed hulls, some difficulty was encountered due to plugging of the underflow orifice. This difficulty was accompanied by some loss of cottonseed hulls in the underflow. The problem became particularly severe after the cyclone had been running for some time and had decreased the concentration of large shale particles to a low value. Apparently, the large shale particles crowded the cottonseed hulls back up into the cyclone and out of the overflow when the shale particles were present, but when they were removed, the cottonseed hulls tended to concentrate toward the underflow in the cyclone. Both the plugging action and the loss were controlled by submerging the underflow orifice of the cyclone. The exact reason for this action is not known. However, the phenomenon was quite beneficial not only in controlling plugging of the cyclone and loss of cottonseed hulls, but also in decreasing the volume of liquid required to carry the bit cuttings out the bottom of the cyclone.

A comparison of operations using the cyclone to operations in a nearby well not using a cyclone showed the following:

| | Without Cyclone | With Cyclone |
|---|---|---|
| Mud Expense (Dollars/Ft.): | | |
| Total | 4.17 | 2.10 |
| Exclusive of Lost Circulation Materials | 3.31 | 1.80 |
| Bits Used | 16 | 12 |
| Times Pump Repaired | 5 | 2 |
| Drilling Rate (Ft./Hr.) | 11 | 14 |

It will be apparent that by use of proper techniques it is possible to reject large shale and sand particles in the underflow from an 8-inch cyclone while retaining lost circulation recovery material, barite and clay in the overhead. Then, by diluting a portion of the overflow stream from the large cyclone and passing it to a 3-inch cyclone it is possible to reject finely divided clay solids in the overflow while recovering barite and lost circulation materials in the underflow. Thus, the two cyclones together give complete control of a drilling fluid shale and clay content, while retaining weighting agents and lost circulation recovery materials. Both the 8-inch and the 3-inch cyclone, or their equivalents, can be used separately, as illustrated, if desired for many purposes.

We claim:

1. The method of controlling the concentration, in a weighted, viscous drilling fluid, of bit cuttings, sand, finely divided clay solids, and contaminants, while retaining most of the weighting material particles which have a specific gravity of at least about 3 compared to water and which are sufficiently finely divided to pass a number 325 screen, comprising passing said drilling fluid to a large cyclone, the cone of said large cyclone having a maximum diameter of from about 6 to about 16 inches and a length of from about 2 to about 6 times said maximum diameter, the ratios of largest cross-sectional area of said cone to the cross-sectional areas of the inlet, apex and large end openings of said large cyclone being about 15:1 to about 150:1, about 70:1 to about 700:1, and about 5:1 to about 50:1, respectively, and said large cyclone being operated with an input pressure and a pressure differential between said input pressure and the pressure in the large end outlet of said large cyclone of about 20 to about 100 pounds per square inch, rejecting from the apex opening of said large cyclone substantially all the bit cuttings and sand particles too large to pass a number 60 screen, together with a portion of the smaller bit cuttings and sand particles, withdrawing from the large end outlet of said large cyclone an overflow stream of drilling fluid from which bit cuttings and sand have been removed, diluting a portion of said overflow stream from said large cyclone with sufficient water to decrease the total solids content to a value no greater than about 20 percent by volume and the viscosity to a value no greater than about 50 centipoises, passing the diluted portion to a small cyclone, the cone of said small cyclone having a maximum diameter of about 2 to about 8 inches and a length of about 2 to about 6 times said maximum diameter, the ratios of largest cross-sectional area of said cone to the cross-sectional areas of the inlet, apex and large end openings of said small cyclone being about 20:1 to about 200:1, about 50:1 to about 500:1, and about 10:1 to about 100:1 respectively, and said small cyclone being operated with an input pressure and a pressure differential between said input pressure and the pressure of the large end outlet of about 20 to about 100 pounds per square inch, rejecting from the large end outlet of said small cyclone an overflow stream containing most of the finely divided clay solids and contaminants introduced into said small cyclone, recovering through the apex outlet of said small cyclone an underflow stream containing most of the weighting materials introduced into said small cyclone, and having substantially the same density as the overflow stream from said large cyclone, and mixing said underflow from said small cyclone with the remainder of the overflow from said large cyclone.

2. The method of claim 1 in which the cone of said large cyclone has a maximum diameter of about 8 inches and a length of about 28 inches, the cross-sectional areas of the input, apex and large end openings of said large cyclone are about 1¼, ³⁄₁₀, and 5 square inches respectively, the cone of said small cyclone has a maximum diameter of about 3 inches and a length of about 11 inches, and the cross-sectional areas of the input, apex, and large end openings of said small cyclone are about ¹⁄₁₀, ½₀ and ²⁄₁₀ square inch, respectively.

3. A method for controlling the concentration, in a weighted, viscous drilling fluid, of finely divided clay solids and contaminants while retaining most of the weighting material particles which have a specific gravity of at least about 3 compared to water, comprising dividing said drilling fluid into a major portion and a minor portion, diluting said minor portion with water to decrease the total solids content to a value of not more than about 20 percent by volume and to decrease the viscosity of said drilling fluid to a value of not more than about 50 centipoises, passing the diluted minor portion of said drilling fluid to a small cyclone, the cone of said small cyclone having a maximum diameter of about 2 to about 8 inches and a length of about 2 to about 6 times said maximum diameter, the ratios of largest cross-sectional area of said cone to the cross-sectional areas of the inlet, apex and large end openings of said small cyclone being about 20:1 to about 200:1, about 50:1 to about 500:1, and about 10:1 to about 100:1, respectively, and said small cyclone being operated with an input pressure and a pressure differential between said input pressure and the pressure of the large end outlet of about 20 to about 100 pounds per square inch, rejecting from the large end outlet of said small cyclone an overflow stream containing most of the finely divided clay solids and contaminants introduced into said small cyclone, recovering through the apex outlet of said small cyclone an underflow stream containing most of said weighting material particles in a slurry having substantially the same density as the original drilling fluid, and mixing said slurry with said major portion of said drilling fluid.

4. The method of claim 3 in which the cone of said small cyclone has a maximum diameter of about 3 inches and a length of about 11 inches, and the cross-sectional areas of the input, apex and large end openings of said small cyclone are about $1/10$, $1/20$, and $2/10$ square inch respectively.

5. The method of controlling the concentration, in a weighted, viscous drilling fluid, of bit cuttings, sand, finely divided clay solids, and contaminants, while retaining most of the weighting material particles which have a specific gravity of at least about 3 compared to water, and which are sufficiently finely divided to pass a number 325 mesh screen, and also retaining most lost circulation recovery material having particles passing a number 10 screen and retained on a number 100 screen, and selected from the group consisting of particles of granular shape having a specific gravity of about 1.3 to about 2.3 compared to water and particles of lamellated shape having a specific gravity of about 2.5 to about 3.5 compared to water, comprising passing said drilling fluid to a large cyclone, the cone of said large cyclone having a maximum diameter of from about 6 to about 16 inches and a length of from about 2 to about 6 times said maximum diameter, the ratios of largest cross-sectional area of said cone to the cross-sectional areas of the inlet, apex and large end openings of said large cyclone being about 15:1 to about 150:1, about 70:1 to about 700:1, and about 5:1 to about 50:1 respectively, and said large cyclone being operated with an input pressure and a pressure differential between said input pressure and the pressure in the large end outlet of said large cyclone of about 20 to about 100 pounds per square inch, rejecting from the apex opening of said large cyclone substantially all the bit cuttings and sand particles too large to pass a number 60 screen, together with a portion of the smaller bit cuttings and sand particles, withdrawing from the large end outlet of said large cyclone an overflow stream of drilling fluid from which bit cuttings and sand have been removed, diluting a portion of said overflow stream from said large cyclone with water and passing it to a small cyclone, sufficient water being employed to decrease the total solids content of said portion to a value of not more than about 20 percent by volume and to decrease the viscosity of said portion to a value not more than about 50 centipoises, the cone of said small cyclone having a maximum diameter of about 2 to about 8 inches and a length of about 2 to about 4 times said maximum diameter, the ratios of largest cross-sectional area of said cone to the cross-sectional areas of the inlet, apex and large end openings of said small cyclone being about 20:1 to about 200:1, about 50:1 to about 500:1, and about 10:1 to about 100:1 respectively, and said small cyclone being operated with an input pressure and a pressure differential between said input pressure and the pressure of the large end outlet of about 20 to about 100 pounds per square inch, controlling the degree of said dilution and the ratio of flows through said apex opening and said large end opening of said small cyclone to produce an overflow stream from the large end opening of said small cyclone having a density no greater than about 9.0 pounds per gallon, and an underflow stream from said small cyclone having a density substantially the same as the overflow stream from said large cyclone, rejecting from the large end opening of said small cyclone an overflow stream containing most of the finely divided clay solids and contaminants introduced into said small cyclone, recovering through the apex opening of said small cyclone an underflow stream containing most of said weighting material particles and said lost circulation recovery material introduced into said small cyclone, and mixing said underflow stream from said small cyclone with the overflow stream from said large cyclone.

6. The method of claim 5 in which the cone of said large cyclone has a maximum diameter of about 8 inches and a length of about 28 inches, the cross-sectional areas of the input, apex and large end openings of said large cyclone are about $1\frac{1}{4}$, $2/10$ and 5 square inches respectively, the cone of said small cyclone has a maximum diameter of about 3 inches and a length of about 11 inches, the cross-sectional areas of the input, apex and large end openings of said small cyclone are about $1/10$, $1/20$, and $2/10$ square inch respectively.

7. The method of controlling the concentration, in a weighted viscous drilling fluid, of finely divided clay solids and contaminants, while retaining most of the weighting material particles which have a specific gravity of at least about 3 compared to water, and also retaining most of the lost circulation recovery material having particles retained on a number 100 screen and having a specific gravity of at least about 1.3 compared to water, comprising dividing said drilling fluid into a major portion and a minor portion, diluting said minor portion of said drilling fluid with water and passing it to a small cyclone, sufficient water being employed to decrease the total solids content of said drilling fluid to a value of not more than about 20 percent by volume and to decrease the viscosity of said drilling fluid to a value not more than about 50 centipoises, the cone of said small cyclone having a maximum diameter of about 2 to about 8 inches and a length of about 2 to about 4 times said maximum diameter, the ratios of largest cross-sectional area of said cone to the cross-sectional areas of the inlet, apex and large end openings of said small cyclone being about 20:1 to about 200:1, about 50:1 to about 500:1, and about 10:1 to about 100:1 respectively, and said small cyclone being operated with an input pressure and a pressure differential between said input pressure and the pressure of the large end outlet of about 20 to about 100 pounds per square inch, controlling the degree of said dilution and the ratio of flows through said apex opening and said large end opening of said small cyclone to produce an overflow stream from the large end opening of said small cyclone having a density no greater than about 9.0 pounds per gallon, rejecting from the large end opening of said small cyclone an overflow stream containing most of the finely divided clay solids and contaminants introduced into said small cyclone, recovering through the apex opening of said small cyclone an underflow stream containing most of said weighting material particles and said lost circulation recovery material introduced into said small cyclone, and having substantially the same density as the original drilling fluid, and mixing said underflow stream with said major portion of said drilling fluid.

8. The method of claim 7 in which the cone of said small cyclone has a maximum diameter of about 3 inches and a length of about 11 inches, and the cross-sectional areas of the input, apex and large end openings of said small cyclone are about $1/10$, $1/20$, and $2/10$ square inch respectively.

References Cited in the file of this patent

UNITED STATES PATENTS

| | | |
|---|---|---|
| 2,377,524 | Samson | June 5, 1945 |
| 2,819,795 | Fontein | Jan. 14, 1958 |
| 2,870,908 | Fitch | Jan. 27, 1959 |

FOREIGN PATENTS

| | | |
|---|---|---|
| 515,053 | Canada | July 26, 1955 |
| 651,094 | Great Britain | Mar. 14, 1951 |

OTHER REFERENCES

Chemical Engineering, June 1955, volume 62, number 6, pages 234–238.

UNITED STATES PATENT OFFICE

CERTIFICATE OF CORRECTION

Patent No. 2,954,871

October 4, 1960

James L. Lummus et al.

It is hereby certified that error appears in the printed specification of the above numbered patent requiring correction and that the said Letters Patent should read as corrected below.

Column 5, line 2, after "pounds" insert -- gage --; column 11, line 66, for "39.5=" read -- 39.5% --; column 12, line 11, for "32.2=" read -- 32.2% --; column 16, line 51, strike out "suction of the centrifugal pump in the reserve pit." and insert instead -- and diesel oil introduced continuously into the pits. --.

Signed and sealed this 25th day of April 1961.

(SEAL)
Attest:

ERNEST W. SWIDER

Attesting Officer

DAVID L. LADD

Commissioner of Patents